US005491521A

United States Patent [19]
Boie et al.

[11] Patent Number: 5,491,521
[45] Date of Patent: Feb. 13, 1996

[54] SCAN VELOCITY MODULATION SYSTEM WITH AUXILIARY VERTICAL DEFLECTION TOWARDS BRIGHT SIDE OF VIDEO SIGNAL TRANSITIONS

[75] Inventors: Werner Boie; Nadine Bolender, both of Strasbourg; Jean-Claude Chevet, Fegersheim, all of France

[73] Assignee: Thomson Consumer Electronics S.A., Courbevoie, France

[21] Appl. No.: 145,981

[22] Filed: Oct. 29, 1993

Related U.S. Application Data

[63] Continuation of Ser. No. 54,563, Apr. 29, 1993, abandoned.

[30] Foreign Application Priority Data

Apr. 30, 1992 [EP] European Pat. Off. .............. 92401233

[51] Int. Cl.$^6$ ................................. H04N 3/32; H04N 5/44
[52] U.S. Cl. ........................ 348/626; 348/629; 348/625
[58] Field of Search ..................................... 348/626–631, 348/625, 606, 615, 571, 206, 441, 448, 458, 687, 805; 315/394, 386; H04N 3/32, 5/44, 5/57

[56] References Cited

U.S. PATENT DOCUMENTS

| | | | |
|---|---|---|---|
| 3,980,819 | 9/1976 | Schwartz | 178/7.5 R |
| 4,080,628 | 3/1978 | Jirka | 348/625 |
| 5,014,119 | 5/1991 | Faroudja | 348/625 |
| 5,036,401 | 7/1991 | Antonov et al. | 348/626 |
| 5,196,941 | 3/1993 | Altmanshofer | 348/626 |
| 5,351,094 | 9/1994 | Washine | 348/626 |

FOREIGN PATENT DOCUMENTS 61-225978  7/1986  Japan.

*Primary Examiner*—James J. Groody
*Assistant Examiner*—Safet Metjahic
*Attorney, Agent, or Firm*—Joseph S. Tripoli; Peter M. Emanuel; Richard G. Coalter

[57] ABSTRACT

A video signal is applied to a kinescope having scan velocity modulation for improving picture sharpness in the vertical direction. Pictures from video signals of a type having non-interpolated and vertically interpolated lines (e.g., interlace-progressive up-converted) will tend to exhibit a significant reduction of sharpness in vertical direction. This problem is corrected by applying scan velocity modulation only to the interpolated lines of the video signal. Furthermore, the vertical deflection is restricted to horizontal structures or real vertical transitions, respectively. In order to have a high noise immunity of this sensitive processing, the resulting luminance amplitude of the shifted line as well as the vertical deflection is controlled to be strongly dependent on the current video signal (soft decision).

35 Claims, 5 Drawing Sheets

SCAN VELOCITY MODULATION SYSTEM WITH AUXILIARY VERTICAL DEFLECTION TOWARDS BRIGHT SIDE OF VIDEO SIGNAL TRANSITIONS

CROSS REFERENCE TO RELATED APPLICATIONS

This is a continuation of U.S. application Ser. No. 08/054,563, filed Apr. 29, 1993, now abandoned.

FIELD OF THE INVENTION

This invention relates television systems generally and particularly to methods and apparatus for improving the sharpness of displayed images.

BACKGROUND OF THE INVENTION

When interlaced television signals are "up-converted" to a non-interlaced or "progressive scan" form to double the number of lines for display, the displayed images may tend to exhibit unsharp transitions in vertical direction, This lack of sharpness is normally due to the use of vertical interpolation or line averaging to create "extra" lines for display. The result of that kind of up-conversion is very often that the original interlace picture looks sharper than the up-converted one. In addition to that, large format color TV tubes generally produce a high peak brightness level in order to be acceptable in the consumer market. This presents another problem in that a large beam current in bright areas can lead to a subsequent de-focusing of the resulting spot on the display.

To overcome these disadvantages, one may use a method of sharpness enhancement commonly known as vertical scan velocity modulation (hereafter, VSM). In systems employing vertical scan modulation the interpolated line (which represents along horizontal structures the center of the transition) is deflected away from the transition region towards the adjacent line carrying the higher luminance level. This results in an improved sharpness due to an enhanced overshoot of the luminance on the screen without increasing the beam current and avoids the problem of enlarged spot size (blooming) that is one of the potential drawbacks of conventional video signal peaking techniques.

SUMMARY OF THE INVENTION

The present invention resides, in part, in the recognition that special problems arise in scan velocity modulation systems in cases where the input signal is of progressive scan form.

In more detail, the behavior of a VSM (vertical scan modulation) method depends strongly on the properties of the incoming signal that means whether the input signal stems originally from an interlace source or a "really" progressive one (e.g., a progressive camera). Because of the nature of the spatial progressive scan algorithm the up-converted pictures will have an ambiguous vertical transition along horizontal structures within the interpolated lines. The best solution for obtaining the "interstitial" or "in-between" lines implies using a linear filter technique for the interpolation, such as vertical interpolation or, for a simpler solution, a vertical average may be used instead. The vertical transition in that case reaching over two lines leads nevertheless to a significant reduction of sharpness in vertical direction.

It is herein recognized that since there is only the interpolated line which is uncertain with its amplitude and only this line should be deflected in vertical direction. This strategy has several advantages over a VSM algorithm which creates for each line a deflection signal. The following are a few advantages of restricting vertical deflection to the interpolated line:

(i) Firstly, due to the fact that the original lines are not shifted the objects within the picture will keep their original size in the present invention. That is not the case if also the original lines will be shifted. This can lead to an extension of the black regions and the pictures become more coarser than the original ones. Also some black holes can appear between a grey/white transition.

(ii) Secondly, by using a deflection signal for each line the interlace artifacts may be increased because the contours of the objects appear shifted from its original position. These effects have been observed in moving picture parts with fine details in which a new annoying moving structure came up. Such effects cannot occur, if only the interpolated line is shifted in accordance with the invention.

(iii) Thirdly, if the VSM technique described herein is applied in conjunction with an interlace to progressive scan algorithm, no additional line delay becomes necessary.

Furthermore, in accordance with a feature of the invention, it is desirable that the vertical deflection be restricted to horizontal structures or real vertical transitions, respectively. This restriction advantageously avoids the following problems:

(i) firstly, this restriction avoids that again a staircase structure will be introduced at inclined structures;

(ii) secondly, the processed pictures look more natural in real scenes with human faces including the teeth; and (iii) thirdly, the additional deflection only at horizontal structures ensures a flat field reproduction in all other parts of the picture.

By this the properties of the progressive scan conversion algorithm can be kept and the picture quality is not compromised again by "old" interlace distortions or even new artifacts.

The achieved overshoot and the resulting sharpness at vertical transitions depend strongly on the luminance amplitude and the deflection amplitude of the shifted line. In order to have a high noise immunity of this sensitive processing the resulting luminance amplitude of the shifted line as well as the vertical deflection is strongly dependent on the current video signal (soft decision). Also some kind of noise reducing processing (averaging) has been foreseen, but nevertheless the resulting deflection signal can occur with a sharp transition and necessitates therefore a high bandwidth for a voltage-current converter which drives the additional deflection coil.

A method, embodying the invention, includes scanning a picture tube with a scanning beam to produce a picture; vertically deflecting the beam in response to brightness transitions having at least a vertical component; and vertically deflecting the beam only for such lines which are located in-between and are interpolated from original lines of a field.

Apparatus, embodying the invention, comprises a picture tube, an interlace-progressive up-converter, and a vertical scan modulation unit (VSM) coupled to the picture tube and to the up-converter circuit, for generating a signal for additional deflection of the beam of the tube in a vertical direction in response to brightness transitions of a video signal produced by the up-converter circuit. The video signal includes at least a minimum number of vertical component of lines (y(n−1), y(n), y(n+1)) passed from an output of the up-converter circuit to an input of the modulation unit. First circuit means are provided in the modulation unit for enabling the additional deflection solely for such lines (16, 21, 31, 41, n) which are located in-between and are interpolated from original lines of a field.

In accordance with another feature of the invention, a second circuit means may be provided in the modulation unit for changing the brightness of respective pixels ($x_i$) of the interpolated lines in response to the brightness transitions.

BRIEF DESCRIPTION OF THE DRAWING

The invention is illustrated in the accompanying drawing, wherein.

DETAILED DESCRIPTION

As mentioned above, the vertical scan modulation (VSM) unit of the present invention will generate an additional vertical deflection signal only for interpolated lines.

Figure 1:
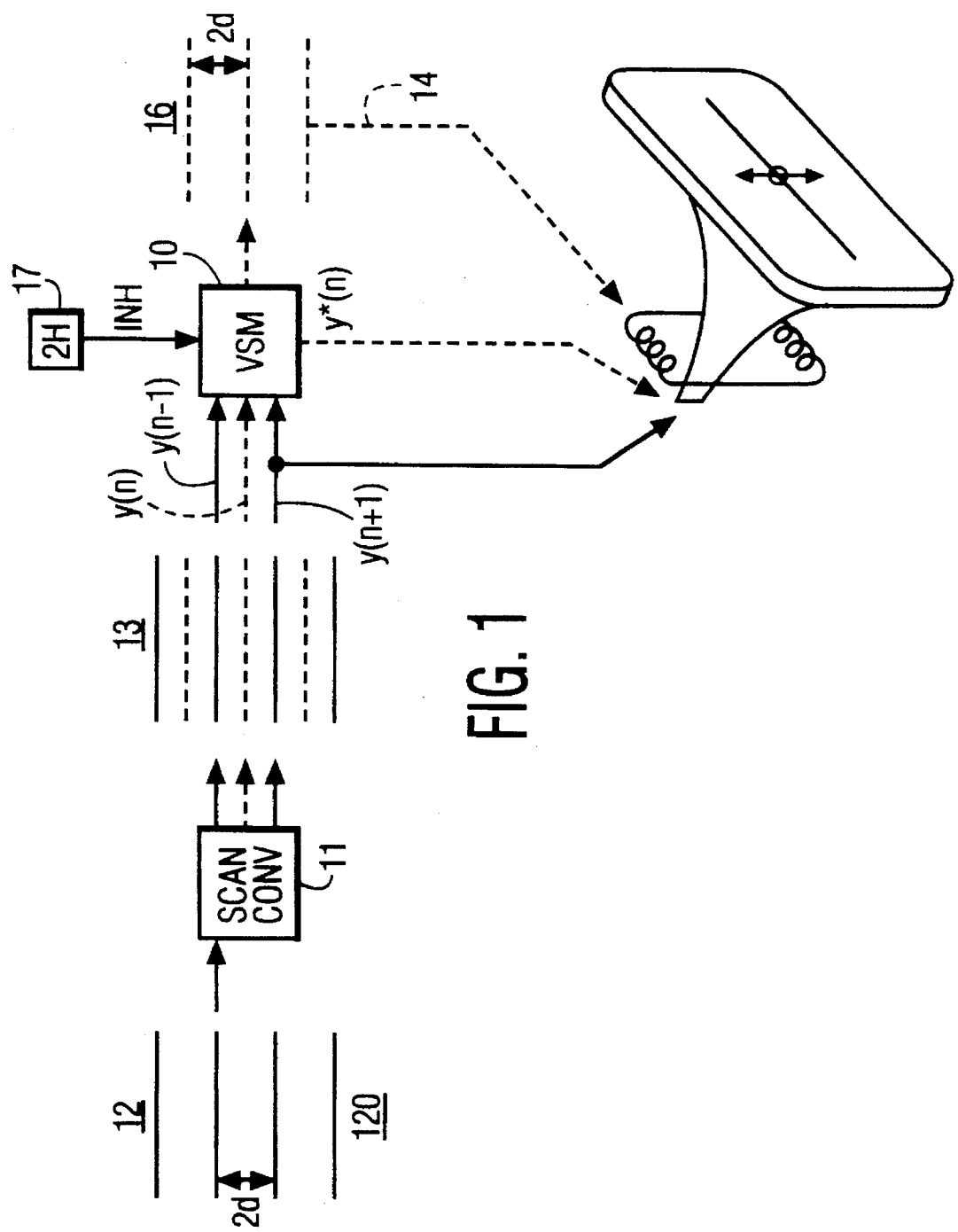
FIG. 1 is a simplified block diagram of a television system employing vertical scan modulation in accordance with the invention.

FIG. 1 gives an overview of the processing. The interlace to non-interlace (progressive) scan converter 11 supplies from each input field 120 an output frame 13 containing all the lines which are necessary for the VSM processing. That means the currently received or "actual" line y(n+1), the delayed line y(n−1) and the interpolated line y(n) go into the VSM 12 processing unit which generates a deflection signal 14 from the interpolated line y(n) and generates modified interpolated lines y*(n) with modified amplitude compared to the original interpolated line y(n). Since these three lines are needed at the same time, they may be obtained by tapping off from delay elements in the scan converter or they may be obtained separately by applying the converter output to a multi-tap delay circuit. The deflection signal 14 is enabled only for the interpolated lines 16 of the frame 13 by means of a double line frequency (2H) square wave provided by source 17 which is synchronized with the horizontal deflection of tube 15 and is applied to an inhibit input of VSM 12. When interpolated lines are being displayed unit 17 enables VSM 12 to produce the auxiliary vertical deflection signal 14. Conversely, when non-interpolated lines are being displayed, unit 17 disables the VSM thereby preventing production of the auxiliary vertical deflection signal 14. The tube 15 receives the original lines and the modified interpolated lines from scan converter 11 and the additional (auxiliary) deflection signal 14 from the vertical scan modulator 12. A multiplex switch (illustrated by arrows) alternately applies (interleaves) the modified interpolated lines y*(n) and the non-interpolated lines for display in progressive scan form by the picture tube 15.

Figure 2A:
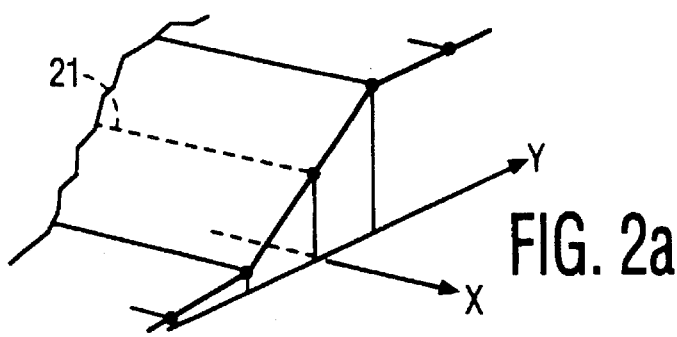
FIGS. 2A and 2B are diagrams illustrating a vertical edge with accompanying luminance amplitude differences.
Figure 2B:
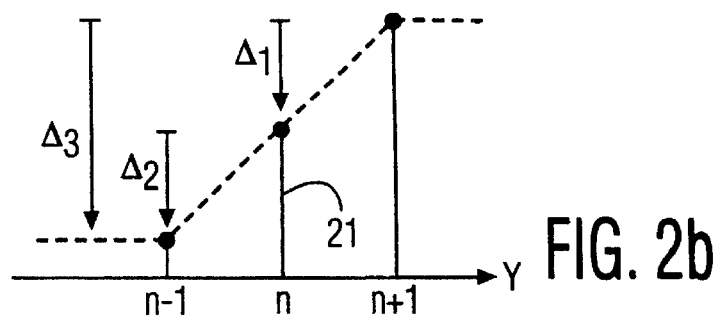

One important function that VSM 12 provides is the detection of the horizontal structures because they represent significant vertical transitions. It is to horizontal structures that the scan modulation technique is applied in the system of FIG. 1 and, desirably, this maintains the properties of the progressive scan conversion algorithm. For that reason the VSM method is based on the assumption that at horizontal structures (due to the vertical average) the vertical transition reaches over two lines. That situation is depicted in FIG. 2. FIG. 2a shows in a three-dimensional view the vertical transition and FIG. 2b depicts amplitude differences at this transition which comprise:

a first difference $D_1$ between the interpolated line n, 21 and line n+1;

a second difference $D_2$ between line n−1 and the interpolated line n; and a third difference $D_3$ between line n−1 and line n+1.

Figure 3A:
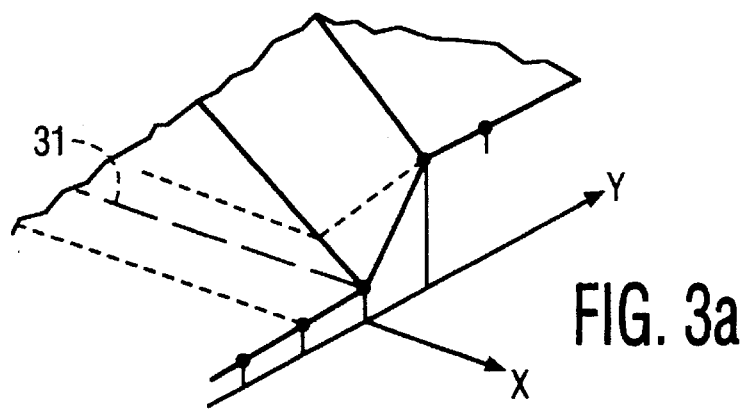
FIGS. 3a and 3b are diagrams illustrating a diagonal edge with accompanying luminance amplitude differences.
Figure 3B:
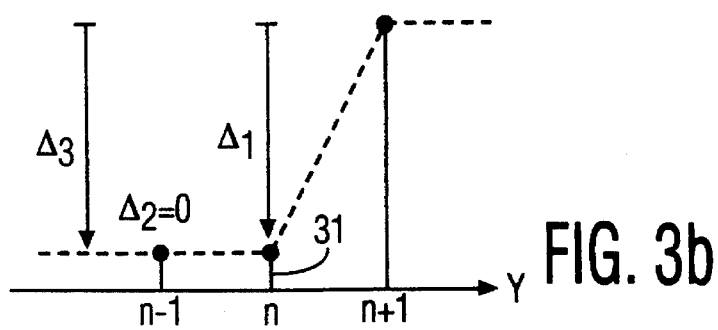

For a diagonal structure it is assumed that the vertical transition reaches normally only over one line. FIGS. 3a and 3b illustrate this case respectively. Therefore the first difference $D_1$ between the interpolated line n, 31 and line n+1 is zero and the second difference $D_2$ between line n−1 and the interpolated line n is equal to the third difference $D_3$ between line n−1 and line n+1. At a first stage within the VSM processing unit 12 it is checked if there is the same sign of the gradient between line y(n−1), line y(n) and line y(n+1) and if the absolute values of both gradients exceed also a given threshold, e.g. of value 16 in case of 8-bit input samples. These checks determine initial conditions for enabling the VSM and may be implemented by the following logic expressions. Specifically, the VSM will be enabled, if {($D_1$ > threshold AND $D_2$ > threshold) OR  (1)

($D_1$ <= threshold AND $D_2$ <= threshold)}

THEN TEST = '1', wherein:

$D_1$=y(n)−y(n+1), and $D_2$=y(n−1)−y(n).

The above test (expression 1) gives an initial selection of whether the VSM should be enabled or not.

In a first approach the VSM internal enabling control signal a can be generated according to the following formula:

IF TEST='1' THEN a=|$D_3$|−| |$D_1$|−|$D_2$| |ELSE a=0,  (2)

In this expression for control signal a, the difference signal D3 equals y(n−1)-y(n+1) and the difference signals $D_1$ and $D_2$ are as given above. In this logic expression, two limit cases are to be regarded:

Firstly, if y(n) is a vertical interpolated value (see FIG. 2), $D_1$ equals $D_2$ and a will become a maximum with a=|$D_3$|.

Secondly, if there is a diagonal structure as given in FIG. 3, a will become zero, i.e. IF{($D_1$=0 AND $D_2$=$D_3$) OR ($D_2$=0 AND $D_1$=$D_3$)}, then a=0

To prevent the deflection signal 14 (defl) from being affected the quantization error of the signal itself, it is desirable to select a resolution of at least 3 bits (that means a 7-step staircase function should be applied). Moreover, it is desirable that the control signal a is limited or clipped ($a_{lim}$) and is signed by the wanted deflection direction. According to that the deflection signal defl becomes:

$$\text{defl=staircase }(a_{lim}), \text{ wherein} \quad (3)$$

$$a_{lim}=128+\text{sign}(D_1)*\min(d,127), d=a \text{ and 8-bit} \quad (4)$$

pixel resolution.

In order to increase the effect of the edge enhancement the luminance value y(n) of the shifted line is advantageously modified according to the logic formula:

$$y**(n)=\min[y(n)*(1+d*\text{facl}/256),255]. \quad (5)$$

Furthermore the modified signal should not exceed the maximum luminance value of both neighboring lines:

$$y*(n)=\min[y**(n), \max(y(n-1), y(n+1))]. \quad (6)$$

Herein the factor facl (illustratively, evaluated by 1.5) has its major influence on transitions between black and grey levels.

Figure 4:
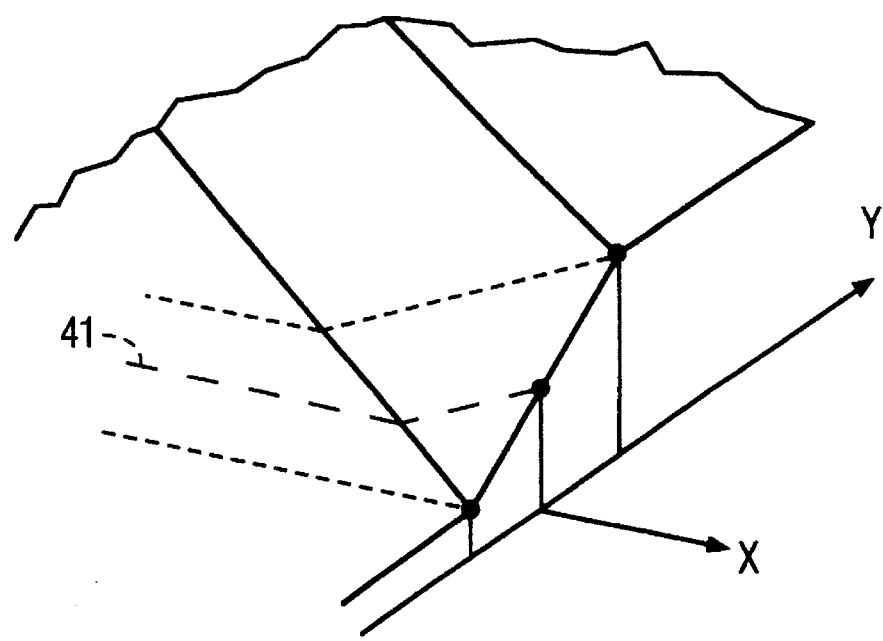
FIG. 4 is a diagram illustrating a diagonal edge with an unsharp transition.

This first approach of the inventive VSM method can significantly improve the sharpness at vertical transitions along horizontal structures, but unfortunately also parts of diagonal contours can be detected as separated small horizontal structures. As a result of this some staircase patterns may occur. The reason for this can be explained by means of the transition time of the edges in horizontal direction. FIG. 4 reflects the situation of a diagonal edge. Due to a horizontal transition reaching over two pixels the VSM method can find a vertical transition over two lines as it was depicted in FIG. 2b. The situation in FIG. 4 is not the only one which can happen, also more extended transitions are possible in natural pictures. The result is that a control signal a is created for a certain number of pixels belonging to a certain part of a declined structure. To put this findings into other words, the VSM method will work accurately if the video signal has a maximum of horizontal resolution and sharpness corresponding to a given sampling frequency.

Figure 5A:
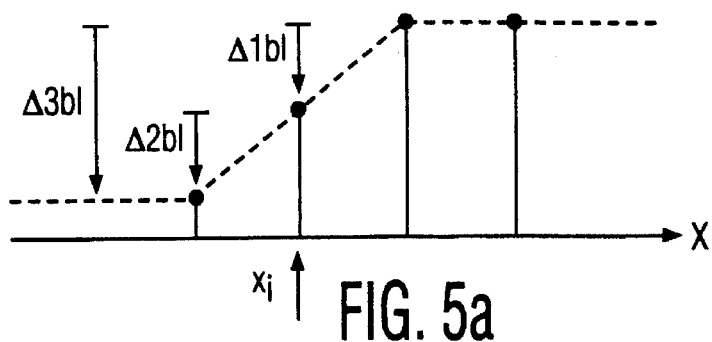
FIGS. 5a and 5b are diagrams illustrating amplitude differences at a horizontal transition and schematic representations of the generated differences (diagonal L)
Figure 5B:
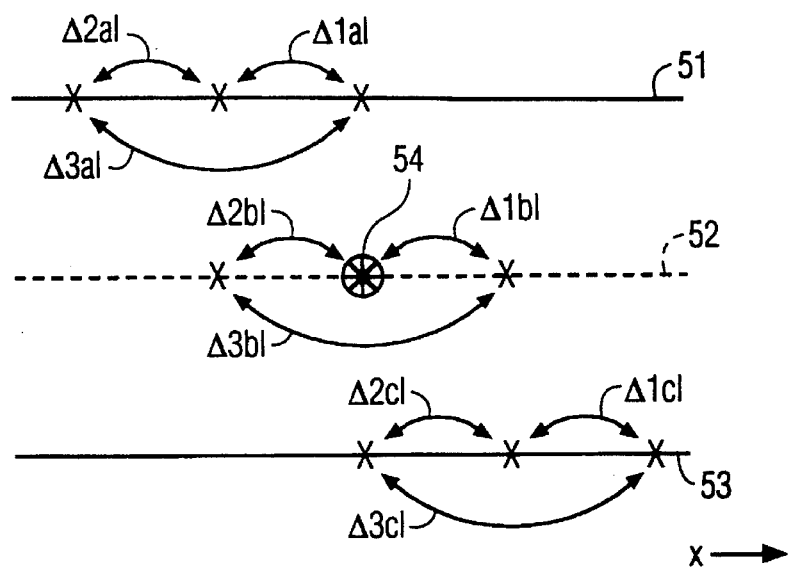

In order to overcome these difficulties a detection of the diagonal structures has been found desirable. The basic idea of how to overcome these problems is to extend the first approach by detecting horizontal transitions which have a transition length of more than one pixel as shown in FIG. 5a. For a better selectivity the same technique should be applied in the adjacent lines but with a horizontal offset of one pixel as depicted in FIG. 5b. Three lines 51 (a), 52 (b) and 53 (c) are depicted, whereby interpolated line 52 includes the current pixel 54 ($x_i$). By this one can achieve the maximum sensitivity in diagonal direction. By means of separate averages over the various kind of the absolute values a correction value, $e_1$, can be created as follows:

$$e_1 = \text{fac2}\{|D_{3al}| + |D_{3bl}| + |D_{3cl}| + \quad (7)$$
$$||D_{1al}| + |D_{1bl}| + |D_{1cl}| -$$
$$|D_{2al}| - |D_{2bl}| - |D_{2cl}||\}$$
with $\text{fac2} = 0.5$.

Figure 6:
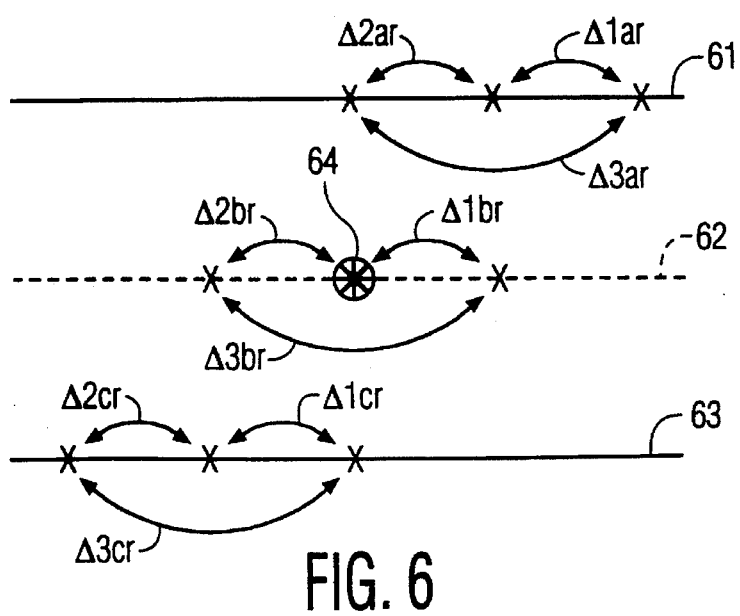
FIG. 6 is a diagram illustrating schematic representations of the generated differences (diagonal R)

Obviously, the other diagonal direction has also to be checked. For that reason a second correction value, $e_r$, has to be introduced (see FIG. 6). This factor may be formed as follows:

$$e_r = \text{fac2}\{|D_{3ar}| + |D_{3br}| + |D_{3cr}| + \quad (8)$$
$$||D_{1ar}| + |D_{1br}| + |D_{1cr}| -$$
$$|D_{2ar}| - |D_{2br}| - |D_{2cr}||\}$$

Three lines 61 (a), 62 (b) and 63 (c) are depicted, whereby interpolated line 62 includes the current pixel 64 ($x_i$).

NB: $D_{1bl} = D_{1br}$
$D_{2bl} = D_{2br}$
$D_{3bl} = D_{3br}$

The resulting control signal d can now be formed by:

$$d=\max(a-\max(e_1,e_r),0) \quad (9)$$

In this formula the diagonal correction values el and er provide compensation of the control signal d for diagonal structures. Investigations have shown that this compensation is quite selective in that only horizontal structures will be detected. The diagonal average of the different kind of absolute values in the above formulas have also proved to be quite effective in terms of noise immunity.

Because of the nature of the correction signal extremely fine horizontal structures, only a few pixels long, cannot be any more detected, but this has been regarded as negligible. Another drawback based on the same principle comes up at the beginning and at the end of a horizontal structure. The resultant control signal has a reduced active time period that means the raising and trailing edge of the control signal are in a region in which the control signal should still have its maximum value. Consequently, at the beginning and the end of the horizontal structure the full sharpness cannot be achieved.

Figure 7:
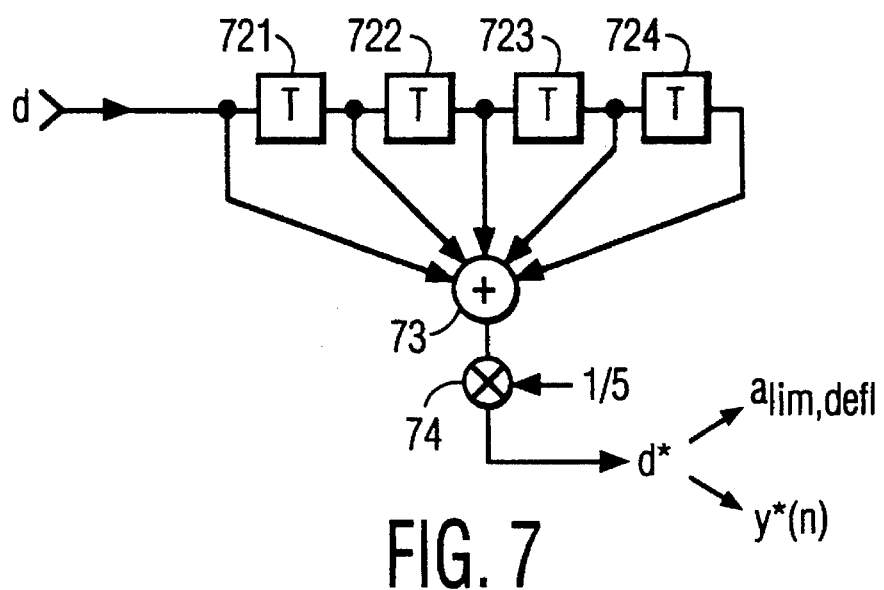
FIG. 7 is a block diagram of a circuit for providing horizontal averaging.

Advantageously, the sharpness problem noted above may be compensated for, in accordance with a further feature of the invention, by averaging the control signal d over a number of pixels. Five pixel averaging has been found to be sufficient. As an example, in FIG. 7 the control signal d is passed through four pixel delays 721, 722, 723 and 724. Then, control signal d and its four delayed values are combined in adder 73. Each sum is divided by five in multiplier 74. The output control signal d* is then used in the VSM processing unit to calculate $a_{lim}$, defl and $y*(n)$. Despite of that kind of low-pass filtering the resulting control signal can alter the control signal clipping raise or fall off very quickly so that the voltage-to-current converter used for driving the deflection coil should have a high bandwidth.

Figure 8:
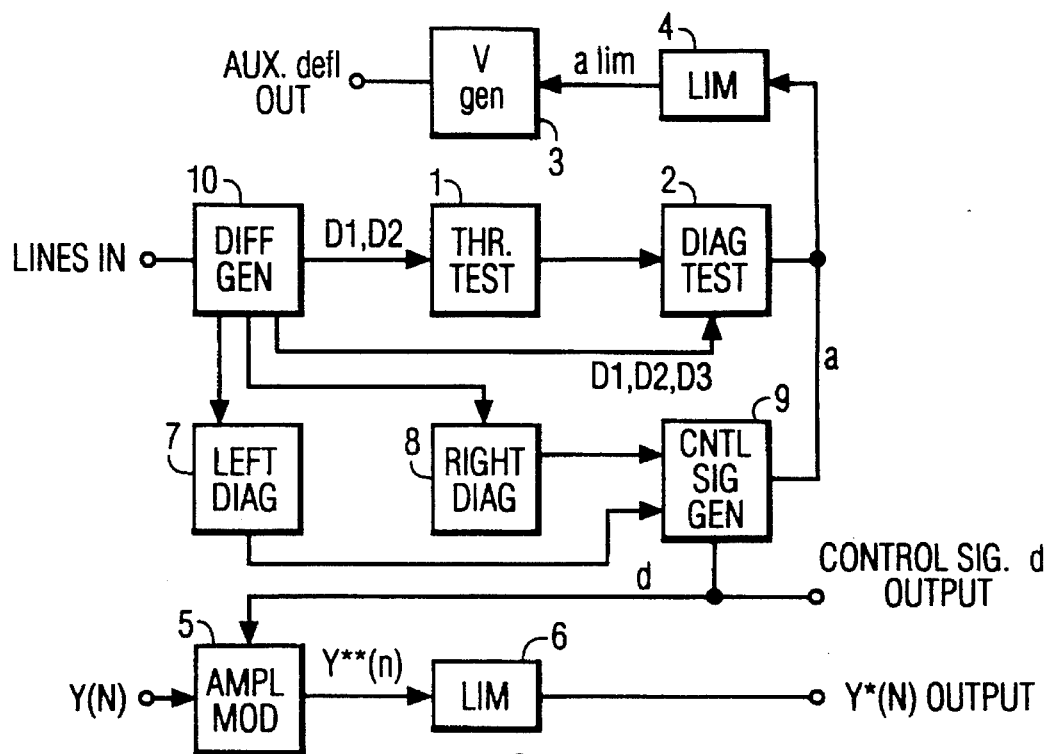
FIG. 8 is a simplified block diagram providing further illustration of vertical scan modulation in the system of FIG. 1.

In the foregoing description a number of logic expressions were given defining various portions of the signal processing. The block diagram of FIG. 8 provides another view of the inter-relationships of the defining logic expressions. To simplify the drawing, multiple lines are represented as single lines.

In FIG. 8 the video lines provided by scan converter 11 are applied to a difference signal generator 10 which includes subtracters for forming a number of difference signals. The difference signals D1 and D2, for example, are applied a threshold detector in block 1 which implements the test of expression (1). The result of this initial test is then applied along with difference signal D1, D2 and D3 to block 2 which implements a diagonal test of expression (2) and outputs the control signal, "a". This signal is then applied to a limiter (block 4) which implements the limiter function defined by expression (4) and the limited signal "a Lim" produced by limiter 4 is applied to a vertical generator 3 (V gen) which produces an auxiliary deflection output signal (Aux defl out). The control signal "a" is further processed by control signal generator 9 which implements the functions of expression 9 of disabling the control signal for diagonal structures to produce a final control signal "d" at its output. Diagonal information for generator 9 is provided by a left diagonal processor 7 which receives pixel difference data from generator 10 and implements the diagonal test of expression (7). Right diagonal information for generator 9 is provided by diagonal processor 8 which receives pixel difference data from generator 10 and implements the right diagonal test specified by expression (8). The control signal "d" is also applied to an amplitude modifier circuit (5) which modifies the amplitude of the interpolated video signal Y(n) in accordance with expression 5 and the resultant signal, Y**(n) is further applied to a limiter circuit 6 which implements the limiting function defined by expression (6) to produce the modified luminance output signal Y*(n) at its output.

Figure 9:
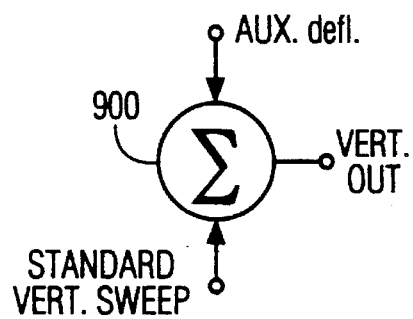
FIG. 9 is a block diagram illustrating a modification of the system of FIG. 1.

FIG. 9 illustrates a modification in which the vertical deflection for the picture tube is obtained by combining a standard vertical deflection signal (e.g., vertical sweep) with the auxiliary vertical scan velocity deflection signal (auxiliary deflection) in a combiner 900. Advantageously, this eliminates the need for a separate auxiliary deflection coil or plate.

The velocity scan modulation (VSM) technique and apparatus shown and described herein advantageously provides a significantly improved picture sharpness while the picture quality is not compromised by new artifacts introduced by the VSM processing.

Figure 10:
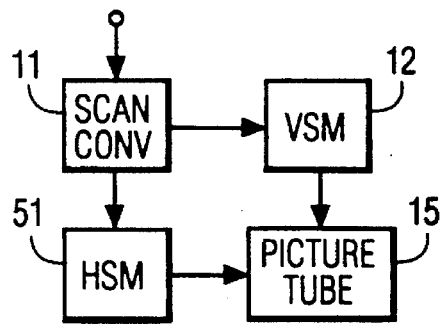
FIG. 10 is a block diagram illustrating another modification of the system of FIG. 1.

Advantageously also a respective horizontal scan modulation (HSM) processor 51 may be added as shown in FIG. 10 in which the scan converter 11, the vertical scan modulator 12 and the picture tube 15 are connected as previously described and a horizontal scan modulator (HSM) 51 has been coupled to receive pixel information from converter 11 and to supply a processed horizontal scan modulation signal to the picture tube. HSM 51 may be of conventional design for video signals which do not horizontally interpolate between pixels.

Advantageously, VSM 12 may also be used for HSM 51 (with suitable delay adaptations) for video signals in which every other pixel of a line is obtained by a process of interpolation or averaging of neighborhood pixels. This situation may arise, for example, in cases where a video signal is decimated for some purpose and then reconstructed for display. The horizontal processing, applied only to the interpolated pixels, will sharpen the edges of vertical structures.

The soft decision for the generation of the deflection signal as well as the modification of the luminance level in the interpolated lines has proved to be very desirable in terms of curved structures.

A further advantageous feature of the disclosed VSM system is that the noise immunity is relatively good due to the several applied averaging techniques that are employed. This is a significant advance over picture detail enhancement systems which rely on conventional "peaking" techniques since such systems typically increase the noise level.

What is claimed is:

1. A method for improving sharpness of pictures displayed with a line structure on a picture tube having a scanning beam, comprising:

scanning said picture tube with said scanning beam to produce said pictures;

providing auxiliary vertical deflection for vertically deflecting said scanning beam in response to brightness transitions having at least a vertical component of a video signal applied to said picture tube;

enabling said auxiliary vertical deflection for said scanning beam only for lines which are located in-between and are interpolated from original lines of a field: and controlling said auxiliary vertical deflection such that at said brightness transitions said beam is deflected to the bright side of said brightness transitions of said video signal.

2. A method according to claim 1, further comprising: combining said auxiliary vertical deflection with a known standard vertical deflection for vertically deflecting said scanning beam.

3. A method according to claim 1, further comprising controlling the amplitude of said auxiliary vertical deflection as a function of pixel difference values derived from at least one of:
  (i) the slope of said brightness transitions of said video signal; and
  (ii) the direction of said brightness transitions of said video signal.

4. A method according to claim 1, further comprising:

controlling the amplitude and the sign of said auxiliary vertical deflection in accordance with a staircase function relating to pixel difference values; and subjecting said auxiliary vertical deflection to an amplitude limitation.

5. A method according to claim 4, further comprising:

modifying the brightness of respective pixels of said interpolated lines according to pixel difference values derived from at least one of (i) the slope of said brightness transitions of said video signal and (ii) the direction of said transitions.

6. A method according to claim 5, further comprising:

varying said brightness modification so as to be stronger between black and grey than between grey and white.

7. A method according to claim 1, further comprising:

providing a control signal for at least one of (i) modifying the brightness of pixels of said interpolated lines, and (ii) modifying said auxiliary deflection of said beam; and averaging said control signal over a plurality of pixels.

8. A method according to claim 1, further comprising:

providing a respective additional deflection for said scanning beam in a horizontal direction for providing additional horizontal deflection to said beam in response to brightness transitions having at least a horizontal component of said video signal applied to said picture tube.

9. Apparatus for improving the sharpness of pictures, comprising:

a picture tube with means for deflecting an electron beam (15) in a vertical direction and a horizontal direction for producing a raster scanned image;

an interlace-progressive up-converter circuit (11);

a vertical scan modulation unit (VSM) coupled to said picture tube and to said up-converter circuit, for generating a signal for additional deflection of said electron beam of said tube in said vertical direction in response to brightness transitions (FIG. 2b, FIG. 3b) of a video signal produced by said up-converter circuit, said video signal having at minimum a vertical component of lines (y(n−1), y(n), y(n+1)) passed from an output of said up-converter circuit to an input of said modulation unit;

first means in said modulation unit for enabling said additional deflection solely for such lines (16,21,31,41, n) which are located in-between and are interpolated from original lines of a field and second circuit means in said modulation unit for changing the brightness of respective pixels (xi) of said interpolated lines in response to said brightness transitions.

10. Apparatus for improving sharpness of pictures displayed with a line structure on a picture tube having a scanning beam, comprising:

means for scanning said picture tube with said scanning beam to produce said picture;

means for providing auxiliary vertical deflection for vertically deflecting said scanning beam in response to brightness transitions having at least a vertical component of a video signal applied to said picture tube;

means for enabling said auxiliary vertical deflection for said scanning beam only for lines which are located in-between and are interpolated from original lines of a field; and means for controlling said auxiliary vertical deflection such that at said brightness transitions of said vertical component said beam is deflected to the bright side of said brightness transitions of said video signal applied to said picture tube.

11. Apparatus according to claim 10, further comprising:

means for combining said auxiliary vertical deflection with a known standard vertical deflection for vertically deflecting said scanning beam.

12. Apparatus for improving sharpness of pictures displayed with a line structure on a picture tube having a scanning beam, comprising:

means for scanning said picture tube with said scanning beam to produce said pictures;

means for providing auxiliary vertical deflection for vertically deflecting said scanning beam in response to brightness transitions having at least a vertical component of a video signal applied to said picture tube;

means for enabling said auxiliary vertical deflection for said scanning beam only for lines which are located in-between and are interpolated from original lines of a field;

means for controlling the amplitude of said auxiliary vertical deflection as a function of pixel difference values derived from at least one of:
  (i) the slope of said brightness transitions of said vertical component of said video signal applied to said picture tube; and
  (ii) the direction of said brightness transitions of said vertical component of said video signal applied to said picture tube.

13. Apparatus for improving sharpness of pictures displayed with a line structure on a picture tube having a scanning beam, comprising:

means for scanning said picture tube with said scanning beam to produce said pictures;

means for providing auxiliary vertical deflection for vertically deflecting said scanning beam in response to brightness transitions having at least a vertical component of a video signal applied to said picture tube;

means for enabling said auxiliary vertical deflection for said scanning beam only for lines which are located in-between and are interpolated from original lines of a field;

means for controlling the amplitude and the sign of said auxiliary vertical deflection in accordance with a staircase function relating to pixel difference values; and means for subjecting said auxiliary vertical deflection to an amplitude limitation.

14. Apparatus according to claim 13, further comprising:

means for modifying the brightness of respective pixels of said interpolated lines according to pixel difference values derived from at least one of (i) the slope of said brightness transitions of said vertical component of said video signal applied to said picture tube and (ii) the direction of said brightness transitions of said vertical component of said video signal applied to said picture tube.

15. Apparatus according to claim 14, further comprising:

means for varying said brightness modification so as to be stronger between black and grey than between grey and white.

16. Apparatus for improving sharpness of pictures displayed with a line structure on a picture tube having a scanning beam, comprising:

means for scanning said picture tube with said scanning beam to produce said pictures;

means for providing auxiliary vertical deflection for vertically deflecting said scanning beam in response to brightness transitions having at least a vertical component of a video signal applied to said picture tube;

means for enabling said auxiliary vertical deflection for said scanning beam only for lines which are located in-between and are interpolated from original lines of a field;

means for providing a control signal for at least one of (i) modifying the brightness of pixels of said interpolated lines, and (ii) modifying said auxiliary deflection of said beam; and means for averaging said control signal over a plurality of pixels.

17. Apparatus for improving sharpness of pictures displayed with a line structure on a picture tube having a scanning beam, comprising:

means for scanning said picture tube with said scanning beam to produce said pictures;

means for providing auxiliary vertical deflection for vertically deflecting said scanning beam in response to brightness transitions having at least a vertical component of a video signal applied to said picture tube;

means for enabling said auxiliary vertical deflection for said scanning beam only for lines which are located in-between and are interpolated from original lines of a field; and means of providing a respective additional deflection for said scanning beam in a horizontal direction in response to brightness transitions having at least a horizontal component of said video signal applied to said picture tube.

18. A method for improving sharpness of pictures displayed on a picture tube having a scanning beam, comprising:

scanning said picture tube with said scanning beam to produce said pictures;

providing auxiliary deflection in a given direction for deflecting said scanning beam in said given direction in response to brightness transitions having at least a component in said given direction of a video signal applied to said picture tube;

enabling said auxiliary deflection for said scanning beam only for picture elements which are located in-between and are interpolated from original elements of a field; and controlling said auxiliary deflection such that at said brightness transitions said beam is deflected to the bright side of said brightness transitions having said component in said given direction of said video signal applied to said picture tube.

19. A method as recited in claim 18 wherein said given direction is a vertical direction.

20. A method as recited in claim 18 wherein said given direction is a horizontal direction.

21. A method for improving sharpness of pictures displayed on a picture tube having a scanning beam, comprising:

scanning said picture tube with said scanning beam to produce said pictures;

providing auxiliary deflection in a given direction for deflecting said scanning beam in said given direction in response to brightness transitions having at least a component in said given direction of a video signal applied to said picture tube;

enabling said auxiliary deflection for said scanning beam only for picture elements which are located in-between and are interpolated from original picture elements of a field; and controlling the amplitude of said auxiliary deflection as a function of pixel difference values derived from at least one of:
   (i) the slope of said brightness transitions; and
   (ii) the direction of said brightness transitions.

22. A method for improving sharpness of pictures displayed on a picture tube having a scanning beam, comprising:

scanning said picture tube with said scanning beam to produce said pictures;

providing auxiliary deflection in a given direction for deflecting said scanning beam in said given direction in response to brightness transitions having at least a component in said given direction of a video signal applied to said picture tube;

enabling said auxiliary deflection for said scanning beam only for picture elements which are located in-between and are interpolated from original picture elements of a field;

controlling the amplitude and the sign of said auxiliary deflection in accordance with a staircase function relating to pixel difference values; and subjecting said auxiliary deflection to an amplitude limitation.

23. A method for improving sharpness of pictures displayed on a picture tube having a scanning beam, comprising:

scanning said picture tube with said scanning beam to produce said pictures;

providing auxiliary deflection in a given direction for deflecting said scanning beam in said given direction in response to brightness transitions having at least a component in said given direction of a video signal applied to said picture tube;

enabling said auxiliary deflection for said scanning beam only for picture elements which are located in-between and are interpolated from original picture elements of a field; and modifying the brightness of respective pixels of said interpolated lines according to pixel difference values derived from at least one of (i) the slope of said brightness transitions and (ii) the direction of said brightness transitions.

24. A method according to claim 23, further comprising:
   varying said brightness modification so as to be stronger between black and grey than between grey and white.

25. A method for improving sharpness of pictures displayed on a picture tube having a scanning beam, comprising:

scanning said picture tube with said scanning beam to produce said pictures;

providing auxiliary deflection in a given direction for deflecting said scanning beam in said given direction in response to brightness transitions having at least a component in said given direction of a video signal applied to said picture tube;

enabling said auxiliary deflection for said scanning beam only for picture elements which are located in-between and are interpolated from original picture elements of a field; and providing a control signal for at least one of (i) modifying the brightness of pixels of said interpolated lines, and (ii) modifying said auxiliary deflection of said beam; and (iii) averaging said control signal over a plurality of pixels.

26. A method for improving sharpness of pictures displayed on a picture tube having a scanning beam, comprising:

scanning said picture tube with said scanning beam to produce said pictures;

providing auxiliary deflection in a given direction for deflecting said scanning beam in said given direction in response to brightness transitions having at least a component in said given direction of a video signal applied to said picture tube;

enabling said auxiliary deflection for said scanning beam only for picture elements which are located in-between and are interpolated from original picture elements of a field; and providing an additional deflection for said scanning beam in a direction normal to said given direction for enhancing the edges of brightness transitions of said video signal in said direction normal to said given direction.

27. Apparatus for improving sharpness of images displayed on a picture tube having a scanning beam, comprising:

means for scanning said picture tube with said scanning beam to produce said images;

means for providing auxiliary deflection in a given direction for deflecting said scanning beam in said given direction in response to brightness transitions having at least a component in said given direction of a video signal applied to said picture tube;

means for enabling said auxiliary deflection for said scanning beam only for picture elements which are located in-between and are interpolated from original picture elements of a field; and means for controlling said auxiliary deflection such that at said brightness transitions said beam is deflected to the bright side of said brightness transitions having said component in said given direction of said video signal.

28. Apparatus as recited in claim 27 wherein said given direction is a vertical direction.

29. Apparatus as recited in claim 27 wherein said given direction is a horizontal direction.

30. Apparatus for improving sharpness of images displayed on a picture tube having a scanning beam, comprising:

means for scanning said picture tube with said scanning beam to produce said images;

means for providing auxiliary deflection in a given direction for deflecting said scanning beam in said given direction in response to brightness transitions having at least a component in said given direction of a video signal applied to said picture tube;

means for enabling said auxiliary deflection for said scanning beam only for picture elements which are located in-between and are interpolated from original picture elements of a field; and means for controlling the amplitude of said auxiliary deflection as a function of pixel difference values derived from at lease one of:
(i) the slope of said brightness transitions having said component in said given direction of said video signal; and
(ii) the direction of said brightness transitions having said component in said given direction of said video signal.

31. Apparatus for improving sharpness of images displayed on a picture tube having a scanning beam, comprising:

means for scanning said picture tube with said scanning beam to produce said images;

means for providing auxiliary deflection in a given direction for deflecting said scanning beam in said given direction in response to brightness transitions having at least a component in said given direction of a video signal applied to said picture tube;

means for enabling said auxiliary deflection for said scanning beam only for picture elements which are located in-between and are interpolated from original picture elements of a field;

means for controlling the amplitude and the sign of said auxiliary deflection in accordance with a staircase function relating to pixel difference values; and means for subjecting said auxiliary deflection to an amplitude limitation.

32. Apparatus for improving sharpness of images displayed on a picture tube having a scanning beam, comprising:

means for scanning said picture tube with said scanning beam to produce said images;

means for providing auxiliary deflection in a given direction for deflecting said scanning beam in said given direction in response to brightness transitions having at least a component in said given direction of a video signal applied to said picture tube;

means for enabling said auxiliary deflection for said scanning beam only for picture elements which are located in-between and are interpolated from original picture elements of a field; and means for modifying the brightness of respective pixels of said interpolated lines according to pixel difference values derived from at least one of (i) the slope of said brightness transitions and (ii) the direction of said brightness transitions.

33. Apparatus according to claim 32, further comprising:

means for varying said brightness modification so as to be stronger between black and grey than between grey and white.

34. Apparatus for improving sharpness of images displayed on a picture tube having a scanning beam, comprising:

means for scanning said picture tube with said scanning beam to produce said images;

means for providing auxiliary deflection in a given direction for deflecting said scanning beam in said given direction in response to brightness transitions having at least a component in said given direction of a video signal applied to said picture tube;

means for enabling said auxiliary deflection for said scanning beam only for picture elements which are located in-between and are interpolated from original picture elements of a field; and means for providing a control signal for at least one of (i) modifying the brightness of pixels of said interpolated lines, and (ii) modifying said auxiliary deflection of said beam; and (iii) averaging said control signal over a plurality of pixels.

35. Apparatus for improving sharpness of images displayed on a picture tube having a scanning beam, comprising:

means for scanning said picture tube with said scanning beam to produce said images;

means for providing auxiliary deflection in a given direction for deflecting said scanning beam in said given direction in response to brightness transitions having at least a component in said given direction of a video signal applied to said picture tube;

means for enabling said auxiliary deflection for said scanning beam only for picture elements which are located in-between and are interpolated from original picture elements of a field; and means for providing an additional deflection for said scanning beam in a direction normal to said given direction for enhancing the edges of brightness transitions of said video signal in said direction normal to said given direction.

* * * * *